(12) United States Patent
Frelechoux et al.

(10) Patent No.: US 7,120,681 B2
(45) Date of Patent: Oct. 10, 2006

(54) CLUSTER CONTROL IN NETWORK SYSTEMS

(75) Inventors: Laurent Frelechoux, Thalwil (CH); Michael Osborne, Au (CH); Paolo Scotton, Horgen (CH); Ilias Iliadis, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 10/059,638

(22) Filed: Jan. 29, 2002

(65) Prior Publication Data
US 2002/0103893 A1   Aug. 1, 2002

(30) Foreign Application Priority Data
Jan. 30, 2001   (EP)   ................... 01102025

(51) Int. Cl.
*G06F 15/177*   (2006.01)
*H04Q 7/00*   (2006.01)
(52) U.S. Cl. ............... 709/221; 709/227; 370/313; 370/349
(58) Field of Classification Search ........ 709/220–222, 709/227–229; 370/313, 338, 349
See application file for complete search history.

(56) References Cited

U.S. PATENT DOCUMENTS

| | | | | |
|---|---|---|---|---|
| 5,987,011 A | * | 11/1999 | Toh | ............................. 370/331 |
| 6,307,843 B1 | * | 10/2001 | Okanoue | .................... 370/312 |
| 6,501,742 B1 | * | 12/2002 | Maeshima | .................. 370/315 |
| 7,035,240 B1 | * | 4/2006 | Balakrishnan et al. | ...... 370/338 |
| 2002/0018448 A1 | * | 2/2002 | Amis et al. | .................. 370/255 |
| 2002/0082035 A1 | * | 6/2002 | Aihara et al. | ............... 455/518 |
| 2002/0103893 A1 | * | 8/2002 | Frelechoux et al. | ........ 709/223 |

OTHER PUBLICATIONS

Lin et al. "A Clustering Technique for Large Multihop Mobile Wireless Networks", Vehicular Technology Conference Proceedings 2000. pp. 1545-1549.*
Liu et al. "Mobile Clustering protocol in wireless ad hoc networks", Communication Technology Proceedings, 2000. pp. 568-573.*

* cited by examiner

*Primary Examiner*—Dung Dinh
(74) *Attorney, Agent, or Firm*—Douglas W. Cameron; Anne Vachon Dougherty

(57) ABSTRACT

Methods and apparatus are provided for controlling the clustering of nodes which implement a cluster-based routing protocol in a data communications network system where the system comprises a plurality of such nodes which are interconnectable to form a plurality of ad hoc networks. For each node which is a member of a cluster, cluster control information (CCMs) is maintained, this cluster control information being dependent on the size of at least the cluster of which that node is a member. On connection of two nodes which are members of two respective clusters, each of the two nodes transmits its cluster control information to the other node, and then determines whether a clustering condition is satisfied. In each node, the clustering condition is dependent on the cluster control information maintained for that node and the cluster control information received from the other node. In each node, if the clustering condition is satisfied, the node then communicates a clustering agreement to the other node. If the clustering conditions of both nodes are satisfied for the two clusters, the two nodes exchange routing information to merge the two clusters.

20 Claims, 6 Drawing Sheets

CLUSTER CONTROL IN NETWORK SYSTEMS

TECHNCAL FIELD

This invention relates generally to control of the clustering of nodes implementing cluster-based routing protocols in data communications network systems.

BACKGROUND ART

In a cluster-based routing protocol, network nodes are organized into clusters, or administrative groups, to simplify the dissemination of routing information in the network and improve the scalability of the routing protocol. Traditionally, the grouping of nodes into clusters is based on a configured cluster identifier. Existing link-state routing protocols such as PNNI (Private Network-to-Network Interface) and OSPF (Open Shortest Path First) are based on this concept. PNNI is a hierarchical, dynamic link-state routing protocol defined by the ATM Forum for use in ATM networks ("Private Network-to-Network Interface Specification Version 1.0 (PNNI 1.0)", ATM Forum af-pnni-0055.000, March 1996). Here, nodes are organized in clusters known as "peer groups" based on a cluster identifier, or "peer group id", which is configured on a per-node and per-hierarchy level basis. The OSPF routing protocol is widely used in IP (Internet Protocol) networks for routing of IP data (J. Moy, "OSPF v2.0", Internet Standard, STD 0054, April 1998). Here, the nodes in a cluster interface with a common OSPF area and the cluster identifier is an area id which is configured per-OSPF interface.

In general in such routing protocols, when a physical node is activated it starts sending Hello messages to discover the identity of its neighbors. The hello message includes the cluster id of the sending node so that a receiving node can determine whether the sending node belongs to the same cluster as itself (the cluster id's match) or not (the cluster id's are different). When the cluster id's match, the receiving node can transmit the necessary routing information to establish an adjacency at the routing protocol level between the two nodes, whereby the newly activated node effectively joins the cluster of the sending node. The routing information transmitted here typically comprises the contents of the sending node's routing database so that the routing databases of the two nodes are synchronized.

Clustering is used to improve the scalability of a routing protocol in that, in operation, the routing information exchanged by nodes which are members of the same cluster is always richer in detail than the information exchanged by nodes belonging to different clusters. For example, in PNNI the details of each peer group are abstracted into a single logical node (a "logical group node" or LGN) which is all that can be seen by nodes outside of that peer group. The details of nodes and links in a peer group are known only to nodes in that peer group. A network without clusters, or with one single cluster, is known as a flat network. In a flat network, every node knows everything about every other node. Any implementation of a cluster-based routing protocol has a finite maximum cluster size which restricts the number of nodes which can be supported in the same cluster. Above this maximum number the routing protocol is generally either in permanent overload state or collapses.

Traditionally when designing a network, a clustering plan is elaborated. The clustering plan defines the number of clusters with the relevant cluster identifiers, and assigns every node (or routing protocol interface of a node as appropriate) to a cluster. Network clustering plans are generally based on factors such as topological criteria (e.g. nodes in the same building belong to the same cluster), addressing criteria (e.g. to maximize address summarization), organizational criteria (e.g. office branches or network backbone), capacity of links, etc. Thus the cluster id is used to group nodes through administrative means and to force a clustering structure in a network.

In a mobile networking environment, this clustering mechanism has been fully exploited with the mobility of ATM networks specified by the ATM forum in the PNNI mobility extensions ("PNNI Addendum for Mobility Extensions v1.0", ATM Forum af-ra-0123.000, April 1999). Here, a logical group node abstracting a mobile ATM network can roam in the PNNI hierarchy of a terrestrial backbone network. Access point nodes (to which mobile networks can connect) in the backbone network are configured to belong to different clusters (i.e. they have different peer group id's). A mobile logical group node, when joining the hierarchy of the backbone network, dynamically adopts the cluster id of one of its current access points. This concept has proved successful because it allows administrative enforcement of a clustering structure around the mobile networks attached to an access point. A master-slave relationship is defined between an access point node and the mobile networks attached to it. Logically, it is always the logical group node representing a mobile network that adapts its cluster id to that of the access point and not vice versa.

Clustering through administrative means is not, however, appropriate in the case of ad hoc networks. An ad hoc network is a network built dynamically by a number of nodes which connect together in a non-deterministic manner, for example nodes in different mobile networks which establish a connection as a result of common geographical location. Ad hoc networks are characterized by the connectivity changing between nodes and the unpredictability of who will be connected to whom and when. A node, for instance, might move out of reach of its current ad hoc network (leave the ad hoc network), and might establish connectivity with a new ad hoc network (join the ad hoc network). In such an ad hoc environment, use of a cluster-based routing protocol as discussed above would imply manual reconfiguration of the clusters (i.e. the cluster id's) as connectivity changes. A master-slave system, as in the PNNI mobility extensions, cannot help since in general no mobile node can be assumed to be fixed within an ad hoc network and thus be the master and owner of the cluster id. Instead of a master-slave type relationship between nodes, there is a peer-to-peer type relationship where all mobile nodes are "equal". Thus, in an ad hoc environment, the natural way to cluster nodes is through their connectivity, each "island" of nodes (i.e. nodes with connectivity between themselves but no connectivity outside the island) building its own cluster. A problem with this approach, however, is that situations can be envisaged where all mobile nodes are connected, directly or indirectly, to all other mobile nodes. This would result in one huge cluster (equivalent to a flat network or no clustering), prejudicing efficient operation of the routing protocol and potentially causing routing protocol collapse. A mobile node might also, due to its motion, become a "communication bridge" between two previously disconnected ad hoc networks, the resulting situation similarly prejudicing integrity of the routing protocol. Accordingly, it would be desirable to provide a method for controlling the clustering of nodes which operates effectively in an ad hoc environment.

SUMMARY OF THE INVENTION

According to one aspect of the present invention there is provided a method for controlling the clustering of nodes implementing a cluster-based routing protocol in a data communications network system comprising a plurality of such nodes which are interconnectable to form a plurality of ad hoc networks. The method comprises:

for each node which is a member of a cluster, maintaining cluster control information dependent on the size of at least the cluster of which that node is a member;

on connection of two nodes which are members of two respective clusters, in each of the two nodes transmitting the cluster control information maintained for that node to the other of the two nodes, determining whether a clustering condition, dependent on the cluster control information maintained for that node and the cluster control information received from the other node, is satisfied and, if so, communicating a clustering agreement to the other node; and if the clustering condition of each of the two nodes is satisfied for said two clusters, in each of the two nodes exchanging routing information with the other node to merge the two clusters.

In embodiments of the present invention, therefore, each node which is a member of a cluster maintains cluster control information dependent on the size of (at least) its own cluster, and this information is exchanged by two such nodes when a connection is established between them. Each node then decides whether a clustering condition is satisfied, this clustering condition being dependent on the cluster control information for that node's own cluster and the cluster control information received from the other node. Where a node decides that its clustering condition is satisfied, it then communicates a clustering agreement to the other node. If the clustering condition is satisfied on both sides (i.e. each node decides that its own clustering condition is satisfied and it detects a clustering agreement from the other node), then the clusters of the two nodes can be merged. The nodes therefore exchange the necessary routing information to establish an adjacency under the routing protocol, whereby each node effectively joins the cluster of the other node and the two clusters are thereby merged. The clustering of nodes on establishment of a new connection is therefore dependent on clustering conditions being met on both sides, these clustering conditions being dependent in turn on the two sets of cluster control information which reflect the size of the clusters to be merged. The clustering conditions can thus be set to ensure that, if the clusters are merged, the resulting structure will not exceed capabilities on either side, for example that the resulting cluster size will not exceed a maximum acceptable size for each side. The clustering conditions themselves can be based on various factors as discussed further below, but the use of the cluster control information in the clustering decision process allows clustering to be controlled in accordance with network and protocol constraints as connectivities change. Thus, rather than relying on connectivity alone to determine the clustering structure, embodiments of the invention provide a highly efficient cluster control system in which cluster growth can be restricted to preserve stability and avoid routing protocol collapse, and an appropriate topology of routing protocol adjacencies can be formed to enable efficient operation of the routing protocol as connectivity changes in the dynamic ad hoc environment.

While situations can be envisaged where the cluster control information for a node could be maintained independently of the node (for example where a given mobile network has a fixed structure of nodes and the cluster control information is maintained centrally for these nodes), for maximum flexibility the cluster control information for a node is preferably maintained in the node itself As noted above, the cluster control information is dependent on the size of at least the cluster of which the node is a member. The size of the cluster can be represented in various ways. For example, cluster size may be measured in terms of one or more of: the number of nodes in the cluster; the number of links in the cluster; the number of network addresses associated with the cluster (e.g. the set of reachable addresses maintained in accordance with the routing protocol such as the addresses of the cluster nodes and other addresses accessible in the cluster from these nodes) stored in the routing database of the node; and the amount of data stored in the routing database of the node. The cluster control information may be expressed as some function of one or more of such parameters, for example as a set of one or more cluster control "metrics" each of which reflects a particular one of the size parameters. The particular form of the cluster control information is predetermined in systems embodying the invention so that all nodes agree on the "semantic" of the information exchanged. Whatever form is adopted, maintenance of the cluster control information is a dynamic process, the information being dynamically updated to reflect the current situation of the node as connectivities change and cluster size varies.

In some embodiments of the invention, the cluster control information may be dependent on the size of the cluster alone. In other embodiments however, the cluster control information may reflect more directly the size of an ad hoc network in which a node is connected. Thus, where a node is a member of a cluster in an ad hoc network extending beyond the cluster, the cluster control information may be dependent on the size of that ad hoc network. As before, the size, and hence the cluster control information, here may be based on various parameters such as one or more of: the number of nodes in the ad hoc network; the number of links in the ad hoc network; the number of network addresses associated with the ad hoc network and stored in a routing database of the node; and the amount of data stored in the routing database. Of course, topology abstraction processes inherent in the routing protocol may result in different nodes in the same ad hoc network having different views of the network topology. Thus, for a given node, the size of the ad hoc network here may depend on that particular node's view of the network topology. As an example, in a PNNI network where there are multiple hierarchy levels, a given node's cluster control information may indicate the network size as the number of nodes in that particular node's peer group in level 'n' of the hierarchy plus the number of nodes in all higher levels of the network hierarchy as seen by the node.

Embodiments can be envisaged in which the cluster control method is only performed on establishment of a connection between nodes which are each already connected in a respective cluster with one or more other nodes. That is, the cluster control method might not be performed where a new connection involves a node which is not itself connected in an ad hoc network, or not connected in a node cluster in an ad hoc network. Such "lone nodes" could be treated as a special case whereby, on establishment of a connection with such a node, the steps involved in the cluster control decision process are bypassed (e.g. in response to a predetermined signal), and clustering proceeds automatically. For simplicity, however, in preferred embodiments the cluster control process is performed on connection of any nodes implementing the routing protocol, whether or not the connection involves lone nodes. Thus, cluster control information for use in the cluster decision process is preferably maintained for each node, whether or not a lone node. Here, for routing protocols such as PNNI where cluster id's are currently assigned on a per-node basis whereby each node can be a member of only one cluster at any time, a node which is not currently connected in a cluster with other nodes is notionally a member of a cluster consisting of a single node. Thus, for the purposes of the cluster control process described above, all nodes are considered to be members of a cluster with the cluster consisting of one or more nodes. (It is to be understood that, where protocols allow more than one level in the network topology as in a PNNI hierarchy, a device which constitutes a physical node (such as a switch, router, bridge, brouter, etc.) may embody more than one node of the network topology. For example, an ATM switch may embody a node in the network (lowest) level of a PNNI hierarchy as well as one or more logical group nodes in respective, higher levels of the hierarchy. Thus, while a node in any given level of the PNNI hierarchy may be a member of only one cluster (peer group), a number of nodes belonging to clusters in different levels may be embodied by the same physical device).

For routing protocols such as OSPF where cluster id's are currently assigned on a per-interface basis, any given node can be a member of more than one cluster via respective interfaces with those clusters. Here, the step of maintaining cluster control information preferably comprises maintaining cluster control information for each of the plurality of clusters. Like the lone node situation described above, any node which is not currently connected, via any given interface, in a cluster with other nodes can be considered for the purposes of the cluster control process to be a member via that interface of a cluster consisting of a single node. Thus, cluster control information is preferably maintained for each of a node's local interfaces (whether or not currently in use), and is exchanged with a remote node's cluster control information on connection of the two nodes. For each pair of local and remote interfaces, the cluster control information can be tested against the cluster control condition, and if agreement is reached on both sides the clusters associated with those interfaces can be merged.

The clustering condition employed in embodiments of the invention may be defined in various ways and may be, for example, a set of tests relating to respective parameters of the cluster control information as appropriate. Further, the clustering decision may depend on additional parameters over and above the clustering control information. Examples include preconfigured cluster identifiers, and level identifiers dependent on the level of a given cluster in a hierarchical topology. This will be described in more detail below. When a node's clustering condition is satisfied, a clustering agreement may be communicated expressly to the other node by transmitting a clustering agreement signal. Embodiments can be envisaged, however, where a clustering agreement is communicated by implication, e.g. by the absence of a transmission to the contrary within a specified period. Where, as is preferred, a clustering agreement signal is transmitted to the other node, this may be a signal dedicated to that purpose or a customary routing protocol transmission (such as a Hello message) in which information necessary for the establishment of an adjacency is revealed for the first time.

A second aspect of the invention provides a computer program element comprising computer program code means which, when loaded in a processor of a device for connection as a node implementing a cluster-based routing protocol in a data communications network system comprising a plurality of such nodes which are interconnectable to form a plurality of ad hoc networks, configures the processor to perform a method as hereinbefore described.

A third aspect of the invention provides a device for connection as a node in a data communications network system comprising a plurality of such nodes which are interconnectable to form a plurality of ad hoc networks, wherein the device comprises control logic for implementing a cluster-based routing protocol, memory for storing routing information in accordance with said routing protocol, and communications circuitry for communication of data with other said nodes with which the device is connected in use. The control logic is configured such that:

when the device is connected as a node which is a member of a cluster, the control logic maintains cluster control information in said memory, the cluster control information being dependent on the size of at least the cluster of which that node is a member;

when the device is connected as a node which is a member of a cluster, on connection of that node to another said node which is a member of another cluster, the control logic controls transmission to the other node, via said communications circuitry, of the cluster control information maintained in said memory, determines whether a clustering condition, dependent on the cluster control information maintained in the memory and cluster control information received from said other node via said communications circuitry, is satisfied, and if so controls communication of a clustering agreement to the other node; and if said clustering condition is satisfied and a said clustering agreement is communicated to the control logic from said other node, the control logic controls exchange of routing information with the other node to merge the two clusters of the two nodes.

The invention further provides a data communications network system comprising a plurality of devices as described above interconnected to form a plurality of ad hoc networks. It will of course be appreciated that the overall network system in which nodes embodying the invention are connected may include other nodes/devices which do not take part in routing protocol operation and are thus transparent to the routing protocol. In addition, while the description herein focuses on PNNI and OSPF as particular examples of routing protocols employed in embodiments of the invention, in general, methods embodying the invention can be applied to network systems employing any cluster-based routing protocol. IS-IS (Intermediate System-to-Intermediate System—ISO 10589) provides one example of another link-state routing protocol in which, like OSPF, cluster id's are currently assigned on a per-interface basis and to which methods embodying the invention can be applied. With IS-IS, multiple cluster id's can currently be assigned to one interface, so that a node can be a member of more than one cluster via the same IS-IS interface. For the purposes of methods herein, such an IS-IS interface for more than one cluster can be considered as a set of interfaces, one for each cluster, so that the comments herein relating to operation with OSPF apply equally to IS-IS. Moreover, it is to be understood that, in general, where features are described herein with reference to a method embodying the invention, corresponding features may be provided in apparatus embodying the invention, and vice versa.

Preferred embodiments of the invention will now be described, by way of example, with reference to the accompanying drawings in which.

DESCRIPTION OF THE PREFERRED EMBODIMENT

Figure 1:
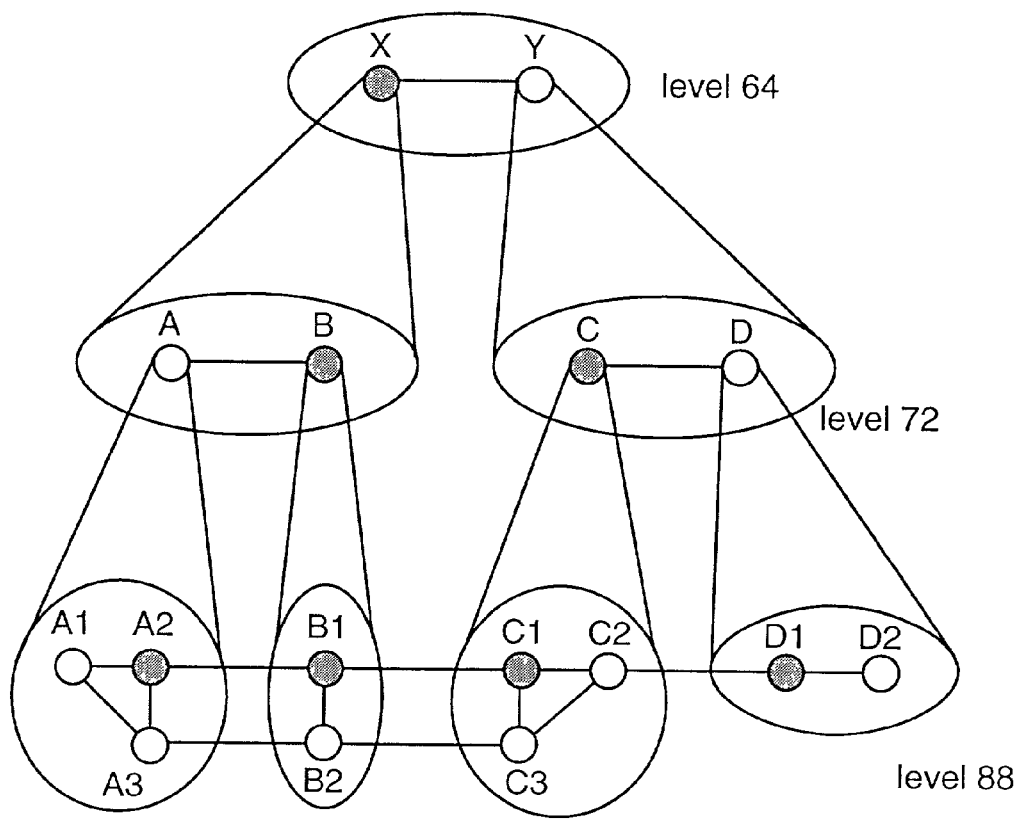
FIG. 1 illustrates a simple example of a PNNI network to which reference will be made in explaining operation of embodiments of the invention.
Figure 2:
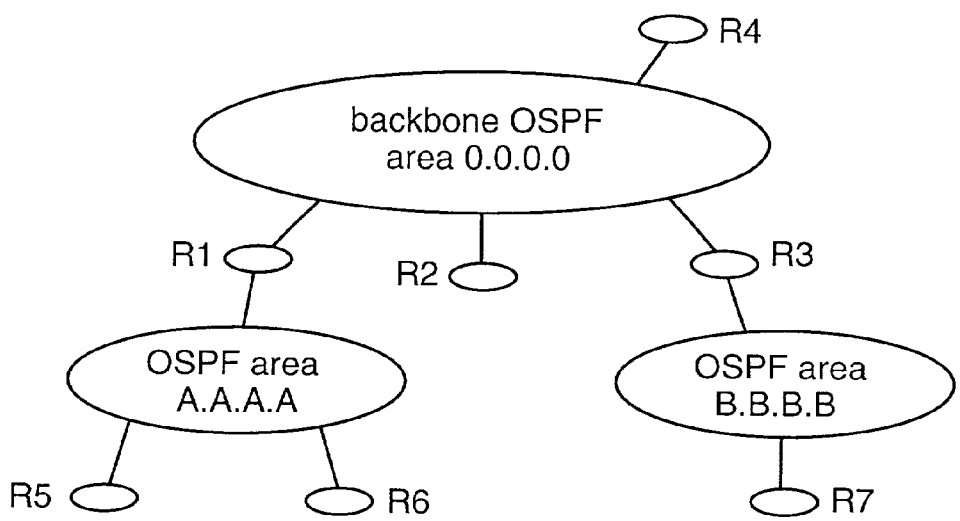
FIG. 2 illustrates a simple example of an OSPF network to which reference will be made in explaining operation of the embodiments.

FIGS. 1 and 2 illustrate examples of routing protocol networks which are useful in understanding operation of the embodiments of the invention described below. FIG. 1 shows a simple, three-level PNNI hierarchical network. In accordance with PNNI, nodes are grouped in clusters known as peer groups, and the details of each peer group are abstracted into a single logical node which is all that can be seen outside of that peer group. This system is applied recursively to provide hierarchical aggregation of network topology information. In the example shown, at the lowest level, here level 88, of the hierarchy, ATM switches embody respective network nodes labeled A1 to D2 in the figure. These nodes are interconnected as illustrated and are grouped in four peer groups represented by the ellipses in the figure. In each peer group, one node serves as the "peer group leader" as indicated by the shading in the figure. In each case, the peer group leader represents its peer group as a logical node in the next level up of the hierarchy, here level 72. Thus, for example, nodes A1, A2 and A3 are clustered to form a peer group which is represented, by node A2, as logical node A in hierarchy level 72. The three other level 88 peer groups are similarly represented as logical nodes B, C and D in level 72. Logical nodes A and B are members of a level 72 peer group which is represented as logical node X in the next level, level 64, of the hierarchy. Similarly, nodes C and D form a level 72 peer group which is represented as logical node Y in level 64. In accordance with the topology abstraction system, the PNNI information exchanged by nodes is such that each node sees the details of its own peer group plus the details of any peer group of a node that represents it at a higher level of the PNNI hierarchy. Thus, for example, nodes A1 to A3 each see the details of their own level 88 peer group, plus the level 72 peer group of nodes A and B and the level 64 peer group of nodes X and Y.

FIG. 2 shows a simple IP network in which network nodes in the form of IP routers R1 to R7 run OSPF. Routers R1 to R4 each have OSPF interfaces with the backbone OSPF area 0.0.0.0 and are thus members of a first cluster via their interfaces with the backbone area. As illustrated, router R1 has a further OSPF interface with OSPF area A.A.A.A and is thus a member of a second cluster together with routers R5 and R6 which also interface with area A.A.A.A. Similarly, router R3 has an interface with OSPF area B.B.B.B and is thus a member of a third cluster together with router R7 which also interfaces with this area. In accordance with OSPF, the routing information exchanged by nodes in a given cluster is more detailed than that exchanged by nodes in different clusters. In particular, while the details of nodes and links in a particular cluster are known by nodes in that cluster, in an adjoining cluster the information is effectively summarized as a set of network addresses accessible via the node (such as R1) which bridges the two clusters. Note here that an OSPF network can be viewed as a hierarchical network with two-levels, the backbone OSPF area constituting one level of the hierarchy, and the adjoining OSPF areas (here areas A.A.A.A and B.B.B.B) constituting a second level of the hierarchy.

Figure 3:
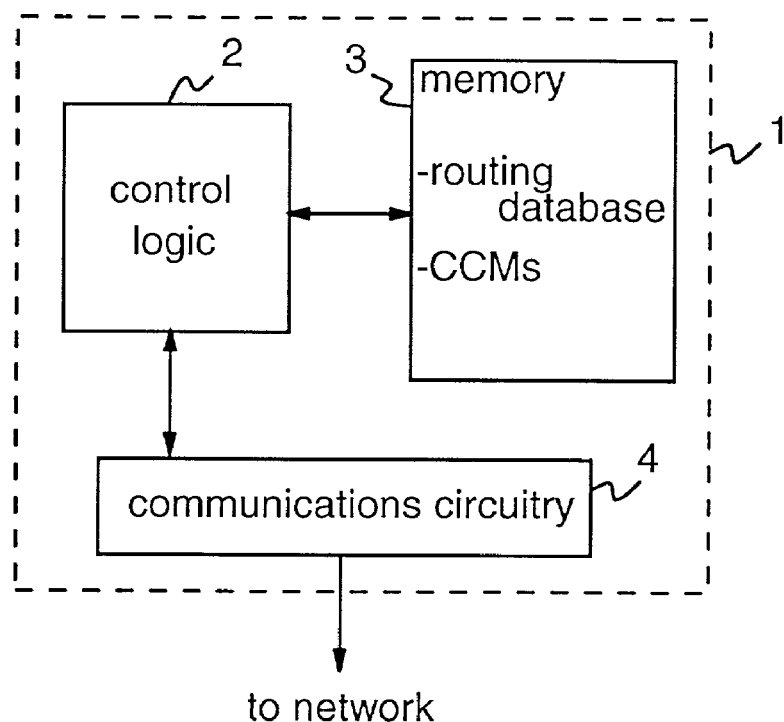
FIG. 3 is a schematic block diagram of a device embodying the invention for connection as a node in an ad hoc network system.

FIG. 3 is a simplified schematic illustrating the main elements of a device for connection as a node in an ad hoc network system embodying the invention. Such a device may be, for example, an ATM switch for a PNNI network system or an OSPF router for an IP network. In general, however, various network devices such as switches, routers, bridges, brouters, etc. may perform cluster control methods embodying the invention. In this embodiment, the device 1 comprises control logic 2, memory 3 and communications circuitry 4 comprising the interfaces and transmission/reception circuits via which the device communicates with the rest of the network. The control logic 2 controls operation of the device generally, implementing the various functions defined by the routing protocol in question. As part of these functions, control logic 2 maintains a routing database in memory 3 containing routing information which defines the device's view of the network topology. Control logic 2 also performs the functions described in detail below for cluster control on establishment of new connections. In addition to the routing database, control logic 2 also maintains cluster control information in memory 3, here comprising a set of one or more cluster control metrics (CCMs) as discussed further below. In general, the control logic 2 may be implemented in hardware or software or a combination thereof, but will typically be implemented by a processor running software which configures the processor to perform the functions described. Suitable software will be apparent to those skilled in the art from the description herein. (Of course, while the processor in device 1 may be preconfigured with appropriate software, the program code constituting such software could be supplied separately for loading in the device to configure the processor to operate as described. Such program code could be supplied as an independent element or as an element of the program code for a number of control functions, and may be supplied embodied in a computer-readable medium such as a diskette or an electronic transmission sent to a network operator).

The device 1 is suitable for use in an ad hoc networking system where multiple such devices are interconnectable to form ad hoc networks, the structure of these networks changing dynamically as connectivities are made and broken between nodes. A typical scenario would be mobile networks on board ships of a fleet, where the connectivity between mobile networks changes as ships move in and out of range of satellite or line-of-sight links. In the embodiments described below, the cluster control metrics maintained in operation by control logic 2 of the device reflect the size of a cluster of which a node embodied by the device is currently a member. Here, a cluster may consist of one or more nodes so that cluster control metrics are maintained for all nodes whether or not connected in a cluster with other nodes. As explained earlier, with some routing protocols (such as PNNI) which are based on per-node clustering, the device may embody more than one node each of which may be a member of a single cluster, and with other routing protocols (such as OSPF) which are based on per-interface clustering, a node may be a member of more than one cluster via respective interfaces. In such cases, the control logic maintains a set of cluster control metrics for each cluster. The set of cluster control metrics contains one or more metrics CCM1, CCM2, . . . , each of which reflects a different parameter by which cluster size is measured in the system, e.g. the number of nodes in the cluster, the number of links in the cluster, etc. as described earlier. These metrics are dynamically updated by the control logic as cluster size varies with changing connectivities in operation. When a new node joins a cluster (a new adjacency is created), the metrics are recomputed to take account of the new member. Similarly, when a node leaves a cluster (adjacency is lost), the metrics are similarly recomputed to take account of the departure.

Figure 4A:
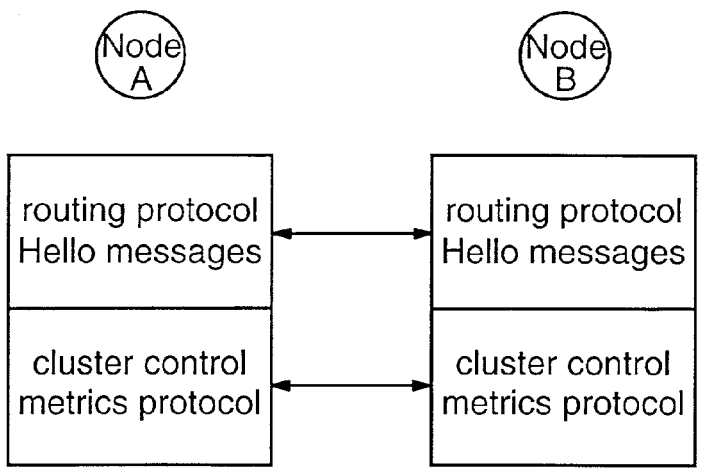
FIGS. 4a to 4c illustrate various methods of communicating cluster control information in embodiments of the invention.
Figure 4B:
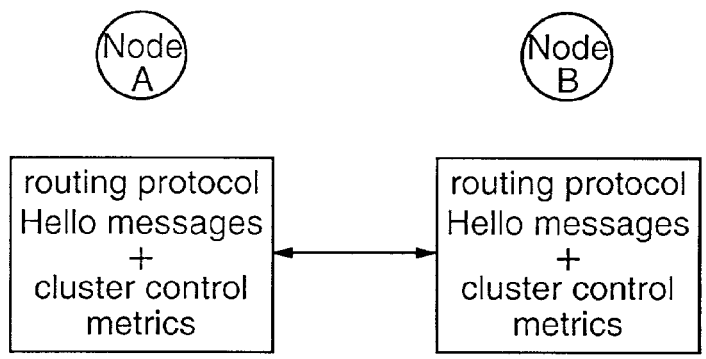
Figure 4C:
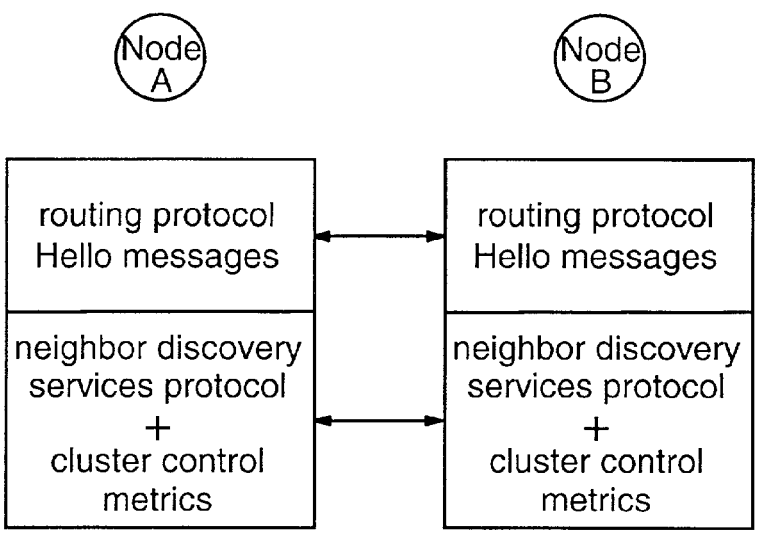

In operation of the system, when the device 1 establishes a connection with another such device, the two devices exchange cluster control metrics. The exchange of cluster control metrics can be implemented in various ways on connection of two nodes as illustrated in FIGS. 4a to 4c. FIG. 4a illustrates a case where the exchange of cluster control metrics is implemented as a new protocol that is run when a physical interface becomes active and before the routing protocol is activated. FIG. 4b shows an alternative where the cluster control metrics are embedded in the Hello messages of the routing protocol. Another example is where the routing protocol uses the services of an overlay network for neighbor discovery, e.g. using PAR (PNNI Augmented Routing) in ATM networks. (PAR is described, for example in "PNNI Augmented Routing (PAR)", af-ra-0104.000, ATM Forum, January 1999, and provides an extension to the PNNI protocol whereby IP information, which is not related to operation of the ATM network in itself, can be distributed over the network by PAR-enabled devices). In such cases, the metrics can be carried in the neighbor's information registered within this overlay network as illustrated in FIG. 4c.

Figure 5:
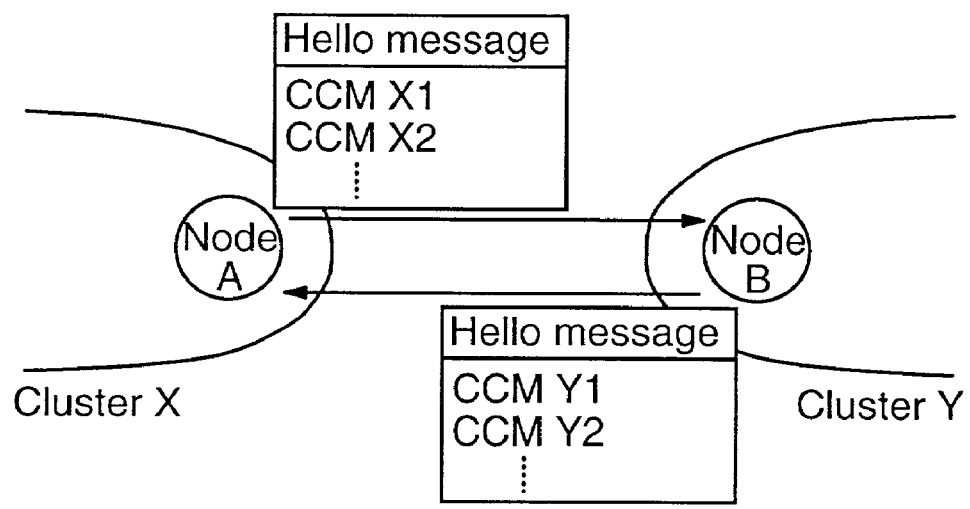
FIG. 5 illustrates communication of cluster control information in Hello messages transmitted between nodes on establishment of a connection.

FIG. 5 illustrates the exchange of cluster control metrics between two nodes A and B, in respective clusters X and Y, when embedded in the Hello messages of the routing protocol. Here it is assumed that each node A, B is a member of only one cluster, whereby the metrics transmitted by node A relate only to cluster X, and those transmitted by node B relate only to cluster Y. An embodiment of the cluster control method performed by each node will now be described with reference to FIG. 6.

Figure 6:
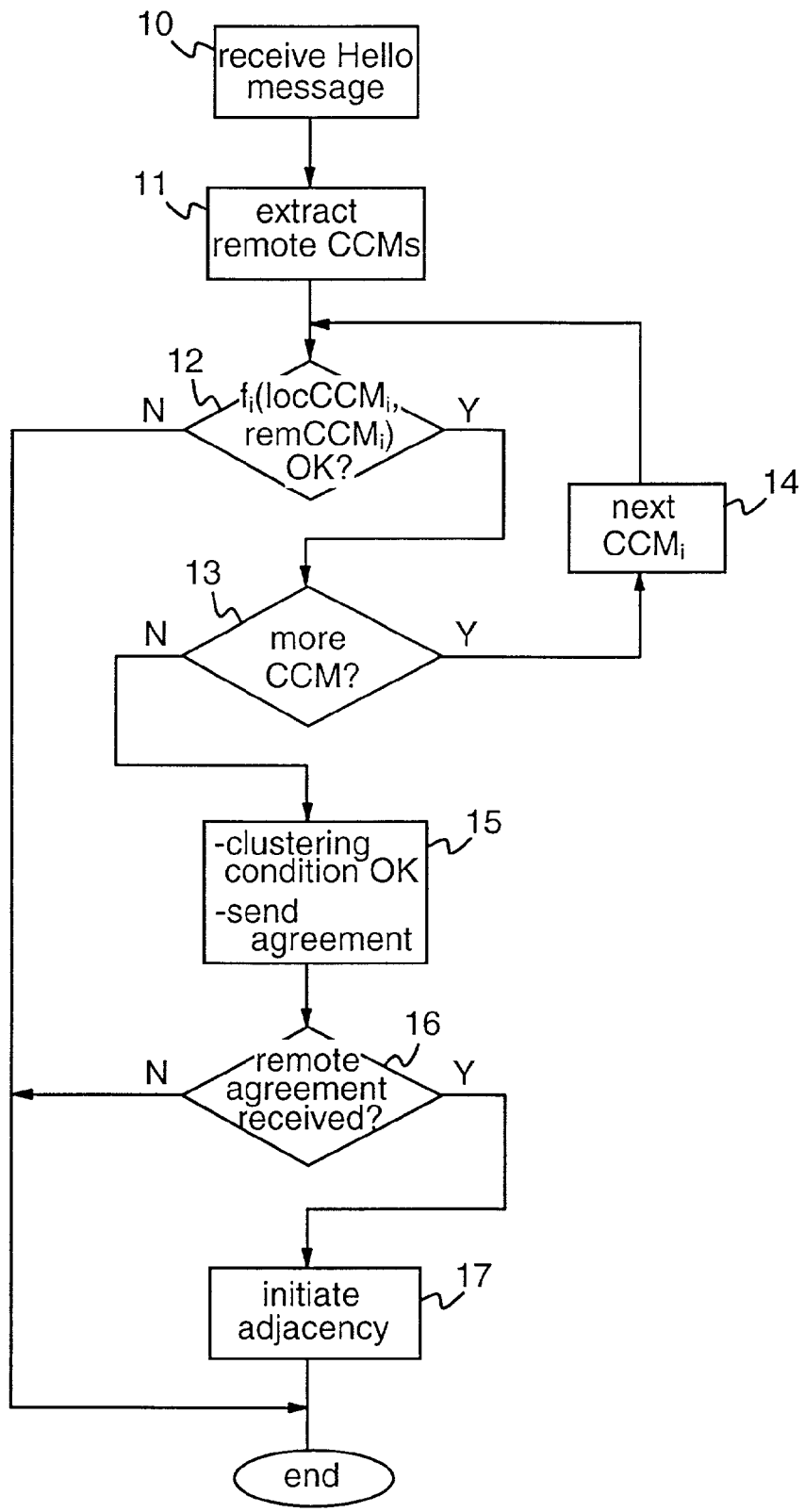
FIG. 6 is a flow chart illustrating one embodiment of a cluster control process performed by a node.

On receipt of a Hello message via communications circuitry 4 of the device 1 as indicated at step 10 of FIG. 6, the control logic 2 extracts the remote node's cluster control metrics at step 11. The control logic must then check whether the remote cluster control metrics, together with the metrics maintained in memory 3 for its local node, satisfy a predetermined clustering condition. In this embodiment, it is assumed that the clustering condition consists of a set of tests, one for each pair of corresponding local and remote metrics. Each test of the clustering condition here checks whether a predetermined function f, of the corresponding local metric (locCCM$_1$) and remote metric (remCCM$_1$) is an acceptable value, for example that the value is less than/ greater than a predetermined threshold, or within a predetermined range. Thus, each of the cluster control metrics can be modeled as an independent Boolean filter, the overall clustering condition only being satisfied, and building of a routing adjacency allowed, if the output of each filter is positive. In step 12 of the process, therefore, the control logic checks the first pair of local and remote metrics for acceptability. If these metrics fail the test as indicated by a "No" at decision block 12, then clustering will not proceed and the process terminates. Assuming the test is passed, however, the control logic checks at step 13 whether there are more metrics to consider, and if so the next pair are selected in step 14 and operation reverts to step 12 where the appropriate test is performed for this pair. Assuming all pairs of local and remote metrics pass the test so that a "No" is eventually obtained at block 13, then at step 15 the clustering condition is deemed satisfied and the control logic transmits a clustering agreement to the remote node via communications circuitry 4. The control logic then determines at step 16 whether a corresponding clustering agreement has been received from the remote node, for example within a specified time interval. If not, as indicated by a "No" at block 16, then the process terminates. However, receipt of a clustering agreement from the remote node indicates that the remote node's clustering condition has also been satisfied, and in this case the clusters of the two nodes can be safely merged. Operation then proceeds to step 17 where the control logic initiates an adjacency with the remote node in the usual way. This process involves transmitting the necessary routing information to establish a protocol adjacency between the nodes, whereby on receipt of the corresponding routing information from the remote node each node effectively joins the cluster of the other node and the two clusters are thereby merged. For link state routing protocols such as PNNI, OSPF and IS-IS, the routing information exchanged typically comprises the contents of the two nodes routing databases so that the routing databases are synchronized.

Figure 7:
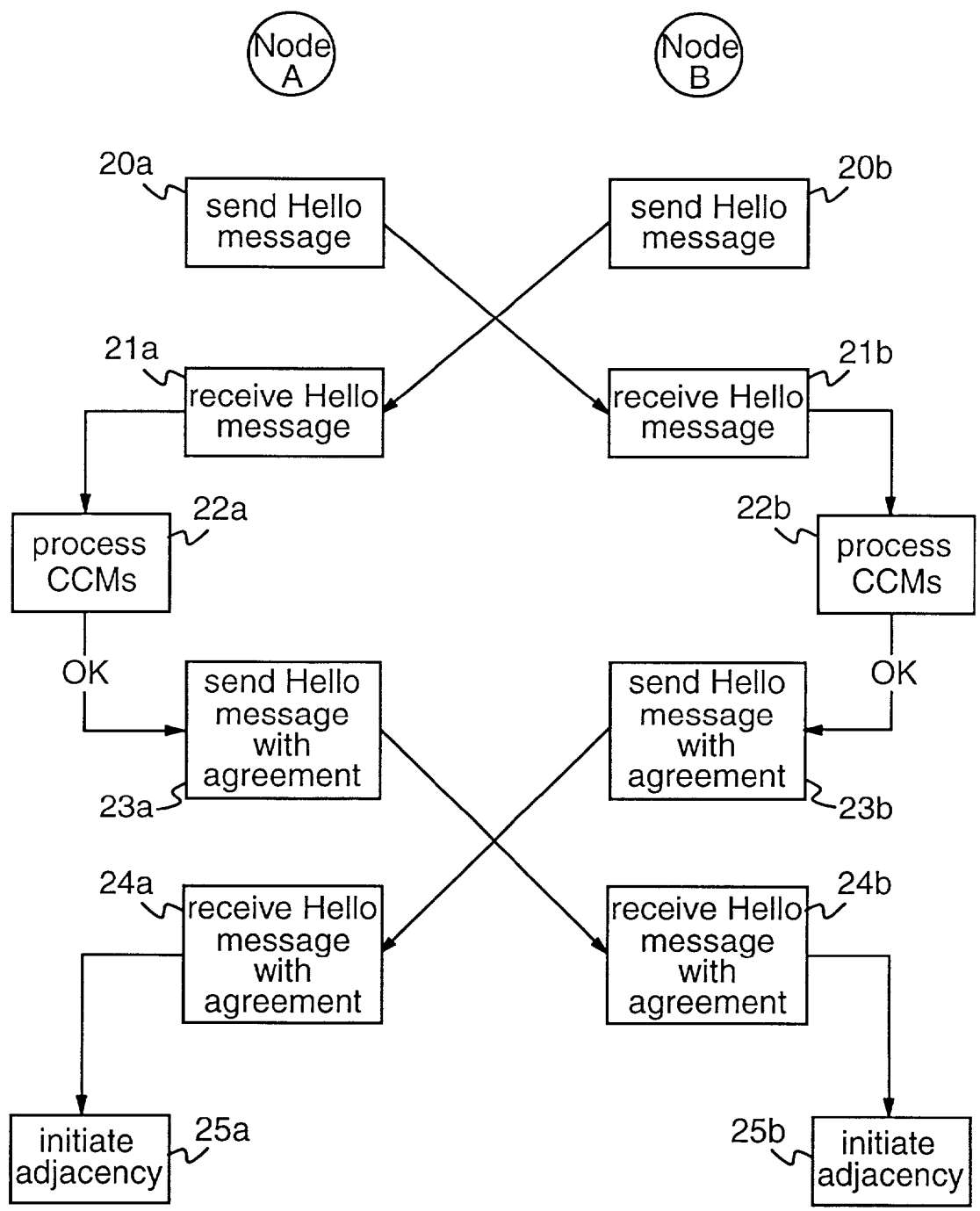
FIG. 7 illustrates operation of the cluster control process between two nodes on establishment of a connection.

It will be seen from the above that cluster control operates on the basis that a protocol adjacency is only established between the two nodes if both of them agree that it should be built. Mutual agreement is confirmed here by the transmission of clustering agreement signals. Thus, if one of the two nodes involved in the negotiation does not send an agreement, the clusters will not be merged. The agreement signal here may be sent in the next Hello message to the remote node. In some embodiments the initial routing protocol Hello messages are modified such that any critical information a node needs to build an adjacency is masked. For example, in the case of PNNI the peer group id can be masked. The control logic only unmasks this information when it has determined that its cluster control condition is satisfied. The action of unmasking such adjacency-critical information in subsequent Hello messages indicates agreement to clustering, whereby a Hello message including the critical information represents the agreement signal. This procedure naturally prevents a remote node initiating an adjacency before it has explicit acknowledgment from the local node. FIG. 7 illustrates operation of the cluster control process here between the two newly-connected nodes. Steps 20a and 20b represent transmission of the initial Hello messages including the cluster control metrics but with adjacency-critical information masked. Steps 21a and 21b correspond to step 10 of FIG. 6 for each node. Steps 22a and 22b correspond to steps 11 to 14 of FIG. 6 in each node. Steps 23a and 23b correspond to step 15 of FIG. 6 where the adjacency-critical information is unmasked by way of a clustering agreement. Steps 24a and 24b correspond to step 16 ("Yes") of FIG. 6 in each case, and steps 25a and 25b correspond to step 17 of FIG. 6 where routing information is exchanged in order to merge the two clusters.

FIG. 6 described above illustrates a general process where the cluster control information for a cluster comprises a set of metrics CCMI, and the clustering condition requires the functions fi of pairs of local and remote metrics to yield acceptable values. The acceptability criteria here can be set as appropriate to ensure that protocol constraints are not exceeded. It will be apparent that various algorithms for processing cluster control metrics can be employed depending, inter alia, on the particular form of the cluster control metrics. By way of example, however, one embodiment uses a single cluster control metric indicating the number of nodes in the cluster (e.g. the PNNI peer group or OSPF area), and the clustering condition is given by: f(locCCM, remCCM)=locCCM+remCCM≦$N_{MAX}$, where $N_{MAX}$ is the maximum desired number of nodes in a cluster. In a preferred embodiment, a single cluster control metric may be employed which indicates the number of nodes in a particular node's level, level n, of a hierarchical topology plus the number of nodes in all higher levels, where the topology here is the topology as seen by the node in question. Thus, for example, the CCM for node A1 in the PNNI network of FIG. 1 in this case would be 3 (nodes A1 to A3)+4 (nodes A, B, C, D)=7. This value is a good estimate of the size of the PNNI database to be "swallowed" if the node establishes a new adjacency at level n. Using the number of nodes as a cluster control metric has the advantage that nodes already have knowledge of this value through standard PNNI or OSPF protocol operations. Again, the clustering condition here can be that the sum of locCCM and remCCM does not exceed a threshold $N_{MAX}$. $N_{MAX}$ may be set to different values for different levels of a hierarchical topology if desired, and can be configured on a per-node (or per-interface) basis, or flooded via the regular routing protocol flooding mechanism. In the latter case, a logical group node active at level X of a PNNI ad hoc network can flood the current value of $N_{MAX}$ for level X within its underlying peer group. Each child node in the peer group can then adopt the value originated by their level X ancestor node as the value of $N_{MAX}$ to be used for level X. In any case, using the protocol flooding mechanism to distribute values for use in clustering conditions allows these values to be updated if constraints change, for example if a new node with less routing information capacity joins a network in which case clustering constraints can be modified to account for this, i.e. on a "weakest link" basis.

For simplicity, the cluster control process has been described with reference to FIG. 6 for a connection between two nodes which are each a member of one cluster. As discussed earlier however, in some protocols a physical node may embody more than one node each of which is a member of a single cluster (e.g. the physical node embodying nodes B1, B and X in the PNNI network of FIG. 1). In other protocols, a physical node may be a member of more than one cluster via respective interfaces (e.g. node R1 in the OSPF network of FIG. 2). Embodiments can be envisaged in which, on connection of two physical nodes, the FIG. 6 process is performed for each pair of local and remote clusters for which the respective nodes maintain cluster control metrics, clustering being allowed wherever the corresponding clustering conditions are satisfied. However, in preferred embodiments, clustering conditions can be dependent on additional parameters over and above the cluster control metrics. For example, each node (or interface as appropriate) may be configured with a cluster identifier, and the clustering condition may include a criterion that the cluster id's of the local and remote clusters match. The cluster identifiers can be transmitted, e.g. with the CCMs, on establishment of a connection between nodes, and each node can test whether the cluster identifiers match for the clusters in question. If so, the CCMs can be processed as before, but if not the clustering condition is deemed not satisfied and the clusters will not be merged. Thus, the cluster id can be considered as an additional Boolean filter. This provides a way to restrict cluster formation based on an administrative cluster id in addition to the cluster control metrics, allowing greater control of the structure of a network with mobile elements. Ad hoc networks are still formed, with the cluster growth controlled by the cluster control metrics in addition to any designed structure defined in an administrative clustering plan. The two mechanisms (cluster id and cluster control metrics) can also be combined to create different classes of ad hoc networks, each class being identified by a different cluster id. For example, in a system involving fleets of ships from different countries, a country may wish to prevent ships from another country integrating in an ad hoc network with ships from its own country. This can be achieved by configuring nodes with different cluster ids for different countries.

A further possibility is to make clustering conditions dependent on a level id indicative of the level of a cluster in a hierarchical topology. For example, two different aggregation layers can be defined by the level ids, one which is used for ad hoc networking between ships of the same country, and another which is used for networking, and hence collaboration, between ships of different countries. Here, clustering will only take place where the level id's associated with the clusters of two nodes match, in addition to satisfactory processing of the cluster control metrics and any other criteria of the clustering conditions such as matching cluster id's. A particular example of a cluster control process based on level id's will be described below with reference to FIG. 8.

Figure 8:
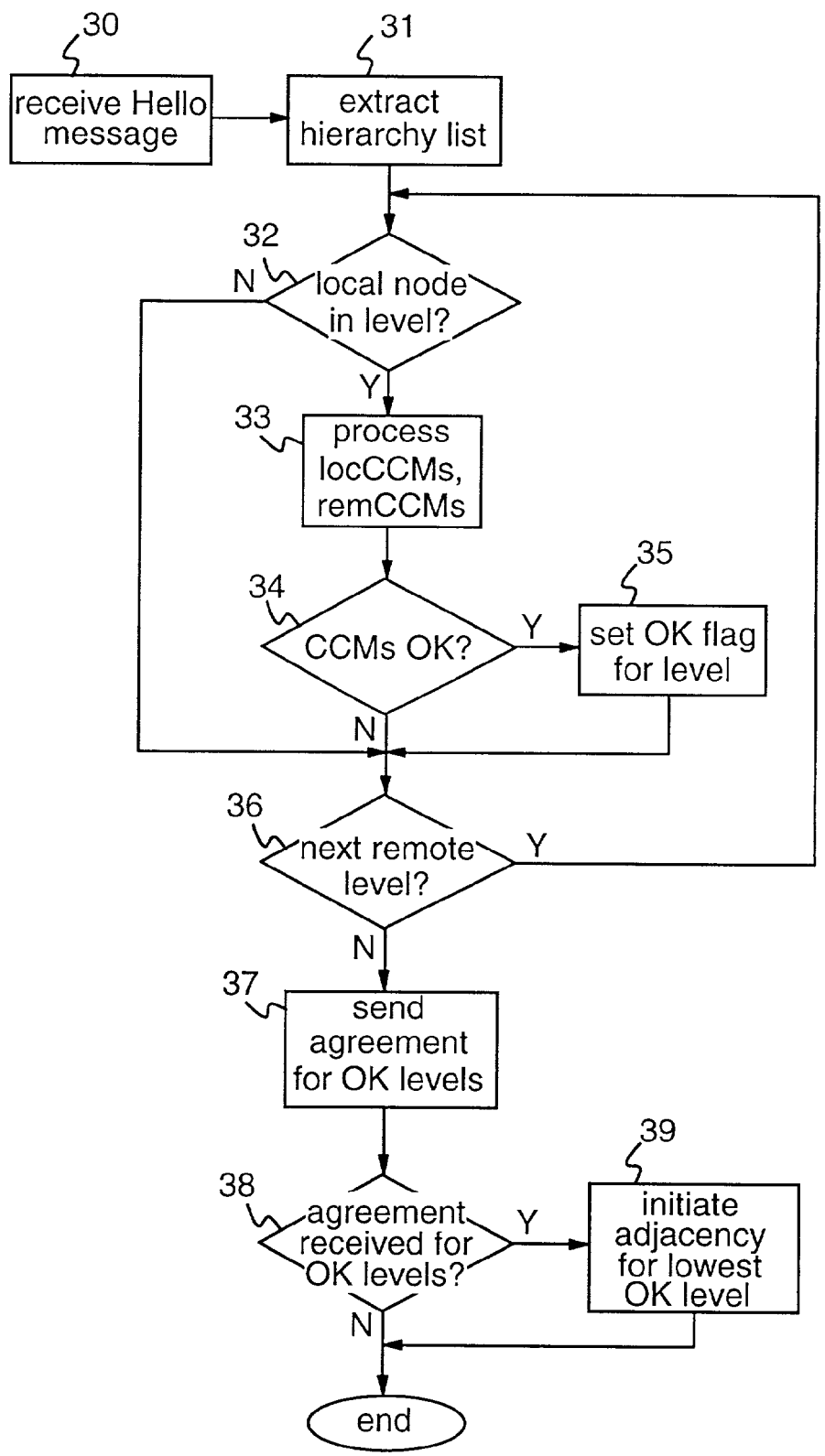
FIG. 8 is a flow chart illustrating another embodiment of the cluster control process performed by a node.

As illustrated by the example of FIG. 1, in hierarchical routing protocols such as PNNI, clusters of network nodes are abstracted into logical nodes and clusters of logical nodes are abstracted into further logical nodes, the system being applied recursively to enable building of very large networks with a hierarchy of clusters. Each logical node is in charge of summarizing the routing information contained in the cluster it represents. Traditionally, the hierarchy is a result of the clustering plan elaborated during design of the network architecture. A physical node, such as an ATM switch, is not configured with only one cluster id, but can be configured with a list of hierarchical levels and a cluster id for each node which it represents in a different level of the hierarchy. Two nodes will establish an adjacency if they are configured to become active at the same level and have the same cluster id at this level. In PNNI, a Hello message thus contains a list of levels and associated peer group id's. This list is known as a nodal hierarchy list. When a physical node receives a Hello message from a remote node, it compares the remote nodal hierarchy list with its own, local nodal hierarchy list. The lowest common level at which the level ids and peer group ids match is the level at which nodes embodied by the two physical nodes will establish an adjacency. Cluster control processes embodying the invention can be applied in such a hierarchical routing protocol either for a single level or for several levels of the hierarchy. Similarly to the nodal hierarchy list, a Hello message can contain a cluster control metrics hierarchy list, each entry in the list containing a set of cluster control metrics and a level id. FIG. 8 illustrates an example of the cluster control process performed by a PNNI node in this case.

Referring to FIG. 8, when a physical node receives a Hello message on establishment of a connection (step 30), the control logic extracts the hierarchy list, containing the level id's and the cluster control metrics for the remote node, in step 31. Next, in step 32 the control logic checks, for a first level indicated by the remote level id's, whether its own hierarchy list contains that level id, i.e. whether the local physical node embodies a node in that level. If so, as indicated by a "Yes" at step 32, operation proceeds to step 33 where the control logic processes the local and remote cluster control metrics for that level and decides, at step 34, whether the necessary tests are passed. Steps 33 and 34 here thus correspond generally to steps 12 to 14 of FIG. 6. If the CCMs pass the tests here, then in step 35 this fact is logged, here by setting a flag in memory 3 for the current level. If the CCMs fail, then operation proceeds to step 36 where the control logic checks whether there are further levels in the remote hierarchy list to consider, and if so selects the entry for the next level whereupon operation reverts to step 32 for this level. If, in any pass of step 32, no local node is found to exist for the current remote level (i.e. the local hierarchy list does not contain a matching level id, then operation proceeds directly to step 36. When all remote levels have been dealt with, as indicated by a "No" at step 36, then in step 37 the control logic transmits a clustering agreement to the remote node for each level for which an acceptability flag was set in step 35. These agreements are conveniently grouped here and sent in a single Hello message. The control logic then checks in step 38 whether an agreement has been received from the remote node (e.g. within a specified time interval) for any level for which an acceptability flag has been set locally. If not, clustering will not occur and the process terminates. However, if an agreement is received for one or more common acceptable levels, then operation proceeds to step 39. Here the control logic selects the lowest of these acceptable levels and transmits the necessary routing information to establish an adjacency between the nodes at this level, whereby the clusters of the two nodes are merged.

It will be seen that, in the cluster control process of FIG. 8, the overall cluster control condition is dependent on two criteria in addition to satisfactory processing of the cluster control metrics. Firstly, the level ids of the local and remote clusters must match. Secondly, no node, which is embodied by the same physical node and for which the clustering condition (and that of the remote node) is satisfied, must exist in a lower level of the hierarchy. That is, clustering is always performed at the lowest common level acceptable to both the local and remote physical node. As before, the clustering agreement can be communicated by revealing adjacency critical information for the first time. Thus, for PNNI, each level of the nodal hierarchy list which contains cluster control metrics can have the peer group id blanked out. A node receives the Hello message from its peer and decides at each level whether an adjacency is possible or not. In the next Hello message sent to its peer, the node reveals the peer group id at all levels where it would allow a protocol adjacency to be established, the peer group id in the remaining levels remaining blank and thus unusable by the peer node.

The use of hierarchical cluster control metrics as described above thus allows efficient design of hierarchical ad hoc networks. The above embodiment ensures that the lowest layers of a hierarchy are filled first since a node always tries to join a network at the lowest level, but where this level is full the node can try to join in the next level of the hierarchy. This property is particularly desirable since it prevents creation of unbalanced hierarchies. Other embodiments might be envisaged, however, where the choice of levels for establishment of adjacencies is made on a different basis. Thus, the overall clustering condition might include a criterion that no node, embodied by the same physical node and for which the clustering condition is satisfied on both sides, exists in a predetermined subset of the levels, where the subset here is not simply any lower level as in the above embodiment. Moreover, the use of hierarchical cluster control metrics, which have associated level id's, is not limited to multilevel hierarchies such as PNNI. As described earlier with reference to FIG. 2, an OSPF network can be viewed as a two-level hierarchy. A two-level hierarchical cluster control metric system can be used to build a such a two-level ad hoc network. In general, therefore, the use of hierarchical cluster control metrics allows the creation of dynamic routing hierarchies while providing efficient control of cluster growth.

While preferred embodiments of the invention have been described in detail above, it will be appreciated that many changes and modifications can be made to these embodiments without departing from the scope of the invention. For example, other embodiments may utilize routing protocols other than PNNI or OSPF which are used as illustrative examples above. IS-IS mentioned earlier provides one particular example of another routing protocol, similar to OSPF, which might be employed in embodiments of the invention. In addition, while in FIGS. 6 to 8 the cluster control process makes use of the routing protocol Hello messages for exchange of information, an explicit cluster control protocol could be employed for transfer of the metrics and clustering agreements if desired. Here, a node establishing a connection can block generation of the Hello messages of the routing protocol until it has confirmed that the metrics are satisfactory and has received a clustering agreement from the remote node. This naturally prevents the remote node initiating an adjacency before mutual agreement has been reached. Further, while the cluster control metrics are employed in the above systems as a mechanism to control the establishment of protocol adjacencies, embodiments can be envisaged where the metrics are also used to control existing adjacencies. For example, as the metrics or network constraints change in an ad hoc network, a node might decide that it is no longer appropriate to maintain an adjacency, and hence decide to leave an existing cluster with other nodes. As a particular example, a situations might arise where a physical node joins two clusters at substantially the same time, such that the local metrics were not updated in time to prevent joining of the second cluster and the resulting situation exceeds desired limits. The control logic can be configured to detect such situations and release one or other of the adjacencies. The cluster control metrics can then be adjusted in the next Hello messages sent to the remote node so that the remote node will not reinitiate the protocol adjacency.

Having thus described our invention, what we claim as new, and desire to secure by Letters Patent is:

1. A method for controlling the clustering of nodes implementing a cluster-based routing protocol in a data communications network system comprising a plurality of such nodes which are interconnectable to form a plurality of ad hoc networks, the method comprising:

for each node which is a member of a cluster, maintaining cluster control information dependent on the size of at least the cluster of which that node is a member;

on connection of two nodes which are members of two respective clusters, in each of the two nodes transmitting the cluster control information maintained for that node to the other of the two nodes, determining whether a clustering condition, dependent on the cluster control information maintained for that node and the cluster control information received from the other node, is satisfied and, if so, communicating a clustering agreement to the other node; and if the clustering condition of each of the two nodes is satisfied for said two clusters, in each of the two nodes exchanging routing information with the other node and merging the two clusters.

2. A method according to claim 1 wherein the cluster control information is dependent on at least one of: the number of nodes in the cluster, the number of links in the cluster, the number of network addresses associated with the cluster and stored in a routing database of the node, and the amount of data stored in said routing database of the node.

3. A method according to claim 1 wherein, for each node which is a member of a cluster in an ad hoc network extending beyond the cluster, the cluster control information is dependent on the size of that ad hoc network.

4. A method according to claim 3 wherein, for each node which is a member of a cluster in an ad hoc network extending beyond the cluster, the cluster control information is dependent on at least one of: the number of nodes in the ad hoc network, the number of links in the ad hoc network, the number of network addresses associated with the ad hoc network and stored in a routing database of the node, and the amount of data stored in said routing database of the node.

5. A method according to claim 1 wherein the cluster-based routing protocol is such that a node can be a member of only one cluster at any time.

6. A method according to claim 5 wherein the cluster-based routing protocol is PNNI.

7. A method according to claim 5 further comprising the step of maintaining said cluster control information for each node of said plurality of nodes, wherein any node which is not connected in a cluster with any other nodes is notionally a member of a cluster consisting of a single node.

8. A method according to claim 1 wherein the cluster-based routing protocol is such that a node can be a member of a plurality of clusters via respective interfaces with those clusters, and wherein, for a node which has interfaces with a plurality of clusters, the step of maintaining cluster control information comprises maintaining cluster control information for each of the plurality of clusters.

9. A method according to claim 8 wherein the cluster-based routing protocol is one of OSPF and IS-IS.

10. A method according to claim 8 further comprising the step of maintaining said cluster control information for each node of said plurality of nodes, wherein any node which is not connected in a cluster with any other nodes via a said interface of that node for connection in a cluster is notionally a member via that interface of a cluster consisting of a single node.

11. A method according to claim 1 wherein the cluster control information for a node is maintained in latter said node.

12. A method according to claim 1 wherein the step of communicating a clustering agreement comprises transmitting the clustering agreement to said other node.

13. A method according to claim 1 wherein the cluster control information transmitted by said two nodes on connection thereof is transmitted according to a first protocol prior to activation of said routing protocol.

14. A method according to claim 1 wherein the cluster control information transmitted by said two nodes on connection thereof is embedded in Hello messages of said routing protocol.

15. A method according to claim 1 wherein:

for each said node which is a member of a cluster, a predetermined cluster identifier for that cluster is associated with the node;

the method includes, on connection of said two nodes, in each node transmitting the cluster identifier for the cluster of which that node is a member to the other of the two nodes; and said clustering condition includes a criterion that the cluster identifiers for said two clusters of the two nodes match.

16. A method according to claim 1 wherein:

the routing protocol is a hierarchical routing protocol defining a plurality of hierarchy levels for clustering of nodes;

for each said node which is a member of a cluster, a level identifier, indicative of the hierarchy level of that cluster, is associated with the node;

the method includes, on connection of said two nodes, for each of the two nodes transmitting the level identifier for the cluster of which that node is a member to the other of the two nodes; and said clustering condition comprises a criterion that the level identifiers for said two clusters of the two nodes match.

17. A method according to claim 16 wherein the clustering condition for a said node comprises a criterion that no node, which is embodied by the same physical node and for which the clustering condition, and that of the connected node on establishment of said connection, is satisfied, exists in a predetermined subset of said hierarchy levels of the routing protocol.

18. A device for connection as a node in a data communications network system comprising a plurality of such nodes which are interconnectable to form a plurality of ad hoc networks, wherein the device comprises control logic for implementing a cluster-based routing protocol, memory for storing routing information in accordance with said routing protocol, and communications circuitry for communication of data with other said nodes with which the device is connected in use, wherein the control logic is configured such that:

when the device is connected as a node which is a member of a cluster, the control logic maintains cluster control information in said memory, the cluster control information being dependent on the size of at least the cluster of which that node is a member;

when the device is connected as a node which is a member of a cluster, on connection of that node to another said node which is a member of another cluster, the control logic controls transmission to the other node, via said communications circuitry, of the cluster control information maintained in said memory, determines whether a clustering condition, dependent on the cluster control information maintained in the memory and cluster control information received from said other node via said communications circuitry, is satisfied, and if so controls communication of a clustering agreement to the other node; and if said clustering condition is satisfied and a said clustering agreement is communicated to the control logic from said other node, the control logic controls exchange of routing information with the other node to merge the two clusters of the two nodes.

19. A data communications network system comprising a plurality of devices according to claim 18 interconnected to form a plurality of ad hoc networks.

20. A computer program product comprising a computer usable medium having embodied therein computer readable program code means for causing a processor of a device for connection as a node implementing a clusterbased routing protocol in a data communications network system comprising a plurality of such nodes which are interconnectable to form a plurality of ad hoc networks, to perform a cluster control method comprising the steps of:

when the device is connected as node which is a member of a cluster, maintaining cluster control information dependent on the size of at least the cluster of which that node is a member;

when the device is connected as node which is a member of a cluster, on connection of that node to another said node which is a member of another cluster, transmitting said cluster control information to the other node, determining whether a clustering condition, dependent on the cluster control information transmitted to the other node and cluster control information received from the other node, is satisfied and, if so, communicating a clustering agreement to the other node; and if said clustering condition is satisfied and a said clustering agreement is received from the other node, exchanging routing information with the other node and merging the two clusters of the two nodes.

* * * * *